UNITED STATES PATENT OFFICE.

CORNELIUS V. CHAPIN, OF COLLINSVILLE, CONNECTICUT.

IMPROVEMENT IN VARNISHES FOR COATING AND WATER-PROOFING.

Specification forming part of Letters Patent No. 115,570, dated June 6, 1871.

I, CORNELIUS V. CHAPIN, of Collinsville, in the county of Hartford and State of Connecticut, have invented a certain Compound, which I term Transparent Water-Proof Varnish, of which the following is a specification:

The ingredients of this improved varnish are as follows: Coach varnish, (of commerce,) eighteen (18) parts; olive-oil, four (4) parts; kerosene-oil, three (3) parts—total, twenty-five (25) parts.

The olive-oil and the kerosene-oil can be varied somewhat; either can be increased or diminished two parts without very materially affecting the quality of the varnish; but the proportions given above are those which produce the best results.

The advantages of this varnish are, first, it is almost perfectly transparent; and, second, it resists the passage of water perfectly. Polished articles of steel coated with this varnish have been dipped in brine and then left to dry without thereby taking any rust. A piece of old newspaper coated upon one side with this varnish and then left to dry but twenty-four hours, when it was made into a cup and filled with water, entirely prevented the passage of the water for thirty-four hours, and then it only passed through in infrequent drops.

*Claim.*

I claim as my invention—

A varnish composed of the said ingredients, in substantially the proportions specified.

CORNELIUS V. CHAPIN.

Witnesses:
   JOSEPHINE M. CHAPIN,
   WM. E. SIMONDS.